United States Patent [19]

Buck et al.

[11] Patent Number: 4,925,710
[45] Date of Patent: May 15, 1990

[54] ULTRATHIN-WALL FLUOROPOLYMER TUBE WITH REMOVABLE FLUOROPOLYMER CORE

[76] Inventors: Thomas F. Buck, 3 Butternut Dr., Keene, N.H. 03431; Diane P. Fukuda, Butterfly Hill, P.O. Box 174, Jaffrey, N.H. 03452

[21] Appl. No.: 175,975

[22] Filed: Mar. 31, 1988

[51] Int. Cl.⁵ ............................................. F16L 11/00
[52] U.S. Cl. ................................. 428/34.5; 428/36.9; 428/36.91; 428/220; 428/251; 428/402; 428/412; 428/421; 428/422; 428/423.1; 428/473.5; 428/474.4; 428/515; 138/DIG. 3
[58] Field of Search .................... 428/35.9, 36.9, 36.91, 428/421, 422, 402, 220, 423.1, 474.4, 480, 473.5, 412, 515, 251, 34.5; 264/127, 331.14; 138/DIG. 3

[56] References Cited

U.S. PATENT DOCUMENTS

| | | | |
|---|---|---|---|
| 2,685,707 | 8/1954 | Llewellyn et al. | 18/55 |
| 2,945,265 | 7/1960 | Sell et al. | 18/59 |
| 3,008,187 | 11/1961 | Slade | 264/127 |
| 3,015,604 | 1/1962 | Hochberg | 162/157 |
| 3,529,633 | 9/1970 | Vaillancourt | 604/280 |
| 3,962,153 | 6/1976 | Gore | 428/422 |
| 4,305,983 | 12/1981 | Hoppe et al. | 428/36.9 |
| 4,347,204 | 8/1982 | Takagi et al. | 264/127 |
| 4,430,282 | 2/1984 | Stack | 264/127 |
| 4,430,283 | 2/1984 | Burnett | 264/127 |
| 4,517,247 | 5/1985 | Suzuki et al. | 264/127 |
| 4,580,790 | 4/1986 | Doose | 277/228 |
| 4,596,563 | 6/1986 | Pande | 604/264 |
| 4,636,346 | 1/1987 | Gold et al. | 264/139 |

FOREIGN PATENT DOCUMENTS 53-27660 3/1978 Japan.

*Primary Examiner*—James Seidleck
*Attorney, Agent, or Firm*—David G. Conlin; Patricia A. McDaniels; Donald R. Castle

[57] ABSTRACT

An ultrathin-wall sintered fluoropolymer tube is disclosed which has a wall thickness less than about 0.002 inch (0.051 mm). Also, disclosed are fluoropolymer tubes which have been extruded over and are supported by a removable, sintered fluoropolymer core. Preferably the fluoropolymer core contains an inorganic filler such as glass beads. Integral multilayered tubes which can be used as automotive cables or medical catheters are also disclosed. These multilayered tubes have an inner lubricious sheath comprises of the afore-described sintered fluoropolymer tube, with or without the removable fluoropolymer core, surrounded by an outer sheath comprised of one or more different materials.

53 Claims, 1 Drawing Sheet

ULTRATHIN-WALL FLUOROPOLYMER TUBE WITH REMOVABLE FLUOROPOLYMER CORE

BACKGROUND OF THE INVENTION

This invention relates to an ultrathin-wall fluoropolymer tube having a removable fluoropolymer core and multilayered tubes having such a fluoropolymer tube as an inner lubricious layer.

Polytetrafluoroethylene and related fluoropolymers possess a unique combination of properties that make this material desirable for a variety of applications. It is inert to almost all chemical solvents, is mechanically strong and tough, has exceptional dielectric properties, can be used at high temperatures, and has an exceptionally low coefficient of friction. Such a combination of properties has thus made this material particularly suited for application as wire coatings and tubing, and especially as an inner liner or sheath in multilayered tubes such as automotive cables and catheters where it is desired to have an inner lubricious surface through which a cable or medical instrument can be freely guided. When applied to medical catheters, it is particularly important to be able to form a fluoropolymer tube with as thin a wall as possible so that the catheter can have a maximum inner diameter and a minimum overall outer diameter.

Typically, fluoropolymer tubes are manufactured utilizing a free extrusion. That is, the fluoropolymer is extruded in the form of a hollow tube, then subjected to further processing. This process is satisfactory for tubes with relatively thick walls, but impractical for use in manufacturing thin wall fluoropolymer tubes with wall thicknesses less than 0.002 inch (0.051 mm). As wall thickness decreases, processing by free extrusion becomes much more difficult since the tube can kink or collapse or flatten during further processing and handling. Also, with free extrusion it is difficult to control the interior diameter of the tube to tight tolerances, for example ±0.001 inch (0.0025 mm) or less, which is required for many applications, particularly medical catheters.

Another technique which has been employed to manufacture polymeric tubes, particularly where interior diameter control is important, is to coat the polymer over a metal wire core (or mandrel), either by extrusion of the polymer over the wire or by dipping the wire into a polymer bath, then removing the wire core from the cured polymer by stretching the wire to reduce its diameter and sliding off the polymer tube. The use of a wire core in this technique not only provides better interior diameter control, but also provides a support for the tube during subsequent processing and handling and prevents the tube from collapsing or kinking.

Unfortunately, this technique has a number of disadvantages. Stretching and removing the wire core is a cumbersome process and is impractical to utilize with long lengths of tube. It may be difficult or impossible to remove the core from other than relatively short straight lengths of tube. Obviously, if an entire spool of tube must be cut to shorter lengths and the core removed from each cut piece, this will be an inefficient, time consuming process and will waste product, which in turn will increase the cost of the final product. Also, before the metal core can be removed from the tube, the cut end of the metal core must be carefully dressed so that no barb is present that would tear or damage the interior surface of the tube as it passes over the cut end. This dressing further diminishes the efficiency of the process. In addition to the above difficulties, the wire core will also leave trace amounts of metal or other contaminants on the interior surface of the tube after it is removed. This contamination will have to be removed, such as by flushing with acid, if the tube is to be used for sensitive applications such as a medical catheter. This additional step also greatly diminishes the efficiency of the process and increases the cost of the final product.

It would be highly desirable if a fluoropolymer tube, particularly an ultrathin-wall fluoropolymer tube, could be formed over an easily removable core material. A fluoropolymer core would generally not be expected to be suitable for this purpose since fluoropolymers normally bond together when subjected to sintering temperatures. Thus, there is currently no known core material that will serve as an easily removable mandrel for fluoropolymer tubes without the disadvantages associated with known metal mandrels.

SUMMARY OF THE INVENTION

The present invention embodies an ultrathin-wall sintered fluoropolymer tube and a sintered fluoropolymer tube having a removable sintered fluoropolymer core. It further embodies a multilayered tube comprising an outer sheath of one or more materials surrounding an inner lubricious sheath of the above-described sintered fluoropolymer tube, with or without the sintered fluoropolymer core. The invention also embodies a method of making a sintered fluoropolymer tube with a removable core, as well as a method of making a multilayered tube having an inner lubricious sheath of the above-described sintered fluoropolymer tube with a removable sintered fluoropolymer core.

DESCRIPTION OF THE PREFERRED EMBODIMENTS

Figure 1:
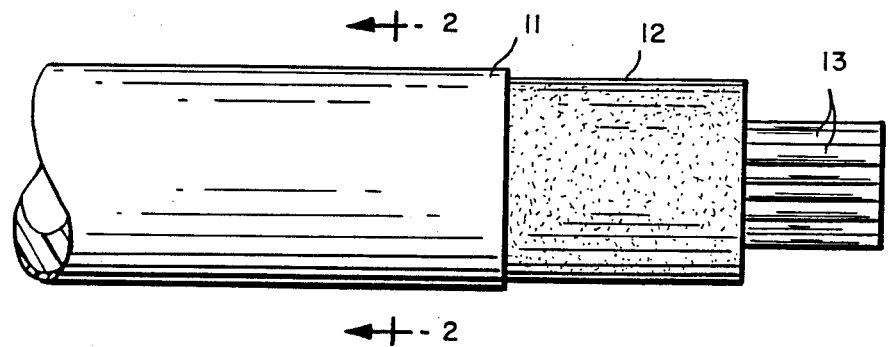
FIG. 1 is a front elevational view of an ultrathin-wall sintered fluoropolymer tube 11 of the present invention supported by a removable fluoropolymer core consisting of a sintered, glass bead filled fluoropolymer coating 12 on a stranded metal wire 13.
Figure 2:
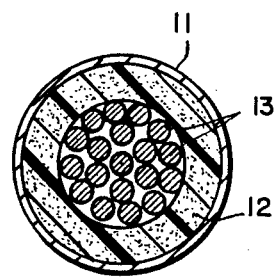
FIG. 2 is a cross-sectional view of the supported tube shown in FIG. 1, taken along line 2—2.

This invention resides in the discovery that a fluoropolymer tube, and particularly an ultrathin-wall fluoropolymer tube, may be extruded over a sintered fluoropolymer core and subjected to further processing including sintering, to give a sintered fluoropolymer tube with an easily removable core. In order to insure that the core is removable from the tube, the composition of the fluoropolymer tube must be sufficiently different from the composition of the fluoropolymer core to prevent them from bonding during the sintering stage. This result is generally achieved by incorporating an inorganic filler in either the tube or core composition. Further details of the fluoropolymer composition and fillers will be described hereinafter.

The term fluoropolymer used throughout the specification and claims is intended to include polytetrafluoroethylene (PTFE) and related fluorinated olefinic polymers and copolymers with similar properties such as fluorinated ethylene propylene (FEP) copolymers, fluoroethylene copolymers with pendant perfluoroalkoxy groups (PFA), trifluorochloroethylene polymers and copolymers, and copolymers of tetrafluoroethylene (TFE) with ethylene. These include fluoropolymers sold under the trademarks TEFLON and TEFZEL by E. I. Dupont Co., HALON by Allied Corp., FLUON by ICI Americas Inc., and HOSTAFLON by American Hoechst Corporation. The preferred fluoropolymer for use in the present invention is polytetrafluoroethylene and TEFLON 6C PTFE fluorocarbon resin has been found to be particularly suitable for the extrusion conditions employed in the manufacture of tubes in accordance with this invention. It is generally intended that for purposes of the present invention, the fluoropolymer resin used to fabricate the tube and the fluoropolymer resin used to fabricate the core are either identical or are so nearly related that they will normally bond together at sintering temperatures absent incorporation of the fillers described hereinafter.

While the tube and core materials are generally fabricated from the same base fluoropolymer resin, it is an important feature of the present invention that the fluoropolymer composition utilized for the tube be sufficiently different from the fluoropolymer composition utilized for the core to insure that the tube does not bond to the core when the tube is subjected to sintering temperatures. This is generally achieved by adding a filler to either the core or the tube composition. Preferably the filler will be an inorganic filler that is stable under the conditions used to sinter the fluoropolymer. Advantageously, the filler will also have a sufficient particle size so that the composition into which it is incorporated will have a slightly uneven surface.

While not wishing to be bound by any theory, it is believed that where one of the components, that is the tube or core, has a smooth surface and the other has an uneven surface, this reduces the effective contact area between the two surfaces and thus facilitates easy removal of the core from the tube. It is also believed that the filler alters the thermal conductivity of the composition in which it is incorporated, rendering it sufficiently different from the other fluoropolymer composition that the two will not bind during the sintering stage. Regardless of the accuracy of the above theory, the presence of the filler in one of the fluoropolymer compositions is effective to prevent bonding of the tube to the core and facilitates easy removal of the core.

Generally, it has been found that good results are achieved when one of the fluoropolymer compositions contains no filler (that is, it is essentially all fluoropolymer except for minor components such as pigments, lubricants, etc.) and the other fluoropolymer composition contains up to about 25% by weight inorganic filler. It is also possible that similar results may be achieved where both fluoropolymer components contain filler, but where the fillers are different or are present at different levels or possibly different particle size ranges.

The filler may be incorporated in either the tube composition or the core composition as desired. This choice may be dictated by the desired properties of the tube being manufactured. Where the tube to be manufactured will be used in a medical catheter, its composition will ideally be essentially straight fluoropolymer, and the core around which it is extruded will contain the filler. For other applications, such as where the tube will be used as a liner for automotive cables, it may be desirable to incorporate the filler into the tube and use straight fluoropolymer in the core. For most applications, however, it is believed that good results can be achieved when the core comprises a filled fluoropolymer and the invention will be further described with respect to this embodiment, although it is not intended to be so limited.

The filler which is contemplated for use with the fluoropolymer compositions of the present invention may be any material which has sufficient heat capacity, stability, strength, inertness, and freedom from impurities (such as volatile or leachable material) that it can withstand the conditions encountered during the processing of the fluoropolymer (e.g. extrusion and sintering).

Generally, the preferred filler material will be a conventional inorganic filler known for use with fluoropolymers. These include glasses, such as lead glasses, soda-lead glasses, soda-lime glasses, borosilicate glasses and E-glasses, minerals such as Kaolin, calcium carbonate, gypsum, calcite, and apatite, ceramic materials such as soda glass, porcelain, thoria, titania, alumina, rare-earth oxides, zirconia, barium titanate, beryllium oxide, magnesium oxide and the like, salts such as sodium chloride and barium chloride, metals such as copper, zinc, and bronze, and intermetallic compounds such as borides, nitrides, carbides and silicides. Organic fillers, including graphite and high temperature engineering plastics such as polyamide-imide and polyphenylene sulfide may also be used. The preferred filler material is glass.

The filler material may come in particles of any shape including spheres, rods, fibers, random angular shapes, etc., but it is believed that best results will be obtained when the particles are spherical shaped or approximately spherical shaped. When such particles are at the surface of the fluoropolymer core, the spherical shape will more readily slide along the inner surface of the tube surrounding the core, than would a coarser type of particle. Also, a smooth surfaced particle will not scratch the tube inner surface as the core is removed.

The particle size of the filler material may be varied as desired, but obviously should be a fraction of the thickness of the material into which it is incorporated. Generally, the particle size will be less than about 100 microns, and preferably less than about 60 microns. It is preferred to utilize particles with a mean particle size between about 5 microns and about 50 microns, most preferably between about 10 and 40 microns.

In accordance with the above guidelines and parameters, the preferred filler material has thus been found to be glass beads (i.e. solid spheres or balloons), preferably made of soda-lime glass or borosilicate or E-glass with a mean particle size of about 10 to 40 microns. Suitable glass beads include those sold under the trademark SPHERIGLASS by Potters Industries, Inc. of Hasbrouck Heights, NJ, particularly the "3000 E" series. Such glass beads may optionally be coated with a coupling agent to improve interfacial bonding.

The level of filler in the fluoropolymer may be varied over a wide range provided that the integrity of the fluoropolymer itself is not adversely affected. Generally, the level of filler may be as high as 30 to 40 percent by weight depending on the density of the filler material, but ordinarily the level of filler would not normally exceed about 30 percent by volume of the sintered fluoropolymer. Suitable levels of filler would thus normally fall within a range of about 5 to 30 volume percent or about 3 to 25 weight percent. Where glass beads are utilized as the filler, the preferred level is about 3 to 10% by weight, most preferably about 4 to 8% by weight.

In fabricating a fluoropolymer tube in accordance with the present invention, first the sintered fluoropolymer core or mandrel, on which the tube will be extruded, must be fabricated. As mentioned earlier, while either the tube or core composition may contain the filler, it is preferred to incorporate the filler into the core composition. Thus, the fluoropolymer resin is first blended with the desired filler, as well as a pigment if desired, then about 15 to 20% by weight organic lubricant (volatile extrusion aid), such as naptha, mineral oil, hydrogenated naphtha, etc., is blended with the dry mix. This fluoropolymer mix is then formed into a cylindrical billet at about 300 to 500 p.s.i. Typically, the billet will have a diameter just fractionally smaller than the extruder barrel into which it will be placed. The billet is then loaded into a ram-type extruder where it is forced through a die at about 5000 to 9000 p.s.i. to form a filled fluoropolymer rod. This rod is then dried by volatilizing the lubricant at temperatures of about 200° to 500° F. (93° to 302° C), then sintered at temperatures of about 650° to 850° F. (343° to 454° C), preferably about 700° F. to 800° F. (371° to 427° C).

In addition to the above-described core material which consists entirely of the filled fluoropolymer, the core material may also advantageously comprise a fluoropolymer coated material, such as a fluoropolymer coated metal wire or stranded metal wire. Thus, a preferred core material may be fabricated by extruding the afore-described filled fluoropolymer billet over a stranded metal wire using known wire-coating techniques, such as is disclosed in U.S. Pat. No. 2,945,265. Typically, the wire to be coated is simply passed through the center of the ram-type extruder and die, and the fluoropolymer is extruded onto the wire at the desired thickness. The fluoropolymer coated wire is then dried and sintered as previously described. A fluoropolymer coated wire is preferred as the core material since the wire provides added strength during subsequent processing and provides a means for splicing cores together.

After the sintered fluoropolymer core has been fabricated, a fluoropolymer sheath or tube can be extruded over this core in the conventional manner. That is, the core is passed through a hollow mandrel of a ram extruder, and virgin fluoropolymer resin (i.e. a preformed billet of resin plus lubricant with optional added pigment) is extruded over the core to the desired thickness. The lubricant is than volatilized from the fluoropolymer tube, typically by passing through an oven or series of ovens at 200° to 575° F., then the tube is sintered at about 650° to 850° F. The core may be removed from the tube at this time, or it may be maintained in place while the tube is subjected to further processing or handling.

As should be apparent, the inside diameter of the fluoropolymer tube is controlled by the diameter of the fluoropolymer core. Since the diameter of the core can be controlled to very tight tolerances, then the inside diameter of the tube can also be controlled to very tight tolerances. Thus, in accordance with the teachings of this invention, fluoropolymer tubes can be fabricated which have an inside diameter that does not vary throughout the length of the tube by more than about ±0.0005 inch (0.013 mm). Such close tolerances are not believed to be achievable using other known techniques, and are particularly desirable for very small diameter tubes, such as those used in medical catheters, where diameter control is essential to their usefulness.

The wall thickness of the fluoropolymer tube produced in accordance with this invention may be any thickness desired within the practical limits of known extrusion, drying and sintering techniques. Such tubes, regardless of wall thickness, will exhibit the above-described inner diameter control. As a practical matter, however, the present invention finds its greatest advantage in the production of thin-wall and ultrathin-wall fluoropolymer tubes which are either difficult or impossible to extrude using a free extrusion technique. In particular, as the tube wall thickness decreases, it becomes much more difficult to handle the tube or subject it to other processing. Such tubes are very susceptible to kinking or collapsing and are easily crushed or flattened. By extruding thin-wall fluoropolymer tubes over a removable fluoropolymer core, as described, all such difficulties are avoided.

Accordingly, the present invention finds particular advantage when ultrathin-wall fluoropolymer tubes having a wall thickness less than about 0.0020 inch (0.051 mm) are fabricated in accordance therewith. More particularly advantageous is the fabrication of ultrathin-wall fluoropolymer tubes having a wall thickness less than about 0.0015 inch (0.0038 mm). Most particularly advantageous is the fabrication of ultrathin-wall fluoropolymer tubes having a wall thickness of about 0.0010 inch (0.0025 mm) ± 0.0005 inch (0.13 mm). Since the production of thin-wall fluoropolymer tubes becomes more difficult as the inner diameter of the tube increases, this invention also finds particular advantage where the above-described ultrathin-wall fluoroplymer tubes have an inner diameter greater than about 0.010 inch (0.254 mm), most particularly when such inner diameter is greater than 0.050 inch (1.27 mm). Where such ultrathin-wall fluoropolymer tubes are to be used as medical catheters, or as an inner layer for a medical catheter, such tubes will advantageously have an outer diameter less than 0.100 inch (2.54 mm).

After the sintered fluoropolymer tube is fabricated, it may be advantageous to maintain the removable fluoropolymer core in place during subsequent processing and handling to prevent the tube from being crushed or flattened. This is particularly desirable where the fluoropolymer tube is to be jacketed or surrounded with one or more other materials in order to provide an integral multilayered tube having an outer sheath comprised of those other materials and an inner lubricious sheath comprised of said fluoropolymer tube. Such multilayered tubes are useful as automotive cables and medical catheters, as well as for many varied types of applications.

In fabricating such multilayered tubes, the inner lubricious sheath would comprise the afore-described sintered fluoropolymer tube, preferably with the removable fluoropolymer core maintained in place. This inner lubricious sheath would then be tightly surrounded by or bonded with the materials desired to form the outer sheath. This outer sheath may comprise one or more materials and one or more layers. Typically, the outer sheath may comprise a flexible polymeric material, such as polyurethanes, polyesters, polyolefins and polyamides, which is extruded over the fluoropolymer tube. It is also contemplated, particularly for application as medical catheters, that the outer sheath of the multilayered tube may comprise two layers-- an outer layer of a flexible polymeric material, as described, surrounding an inner layer of a different material. Obviously, to fabricate such tubes the inner layer would first be applied to the fluoropolymer tube, followed by application of the outer layer. The inner layer may advantageously be braided metal or a rigid polymeric material, such as polycarbonates, polyethylene terephthalate, polyethylene terephthalate glycol, polyamides, polyacetals, polyimides, polyamide-imides, and copolymers thereof.

The nature or number of the layers utilized in the outer sheath of the multilayered tube is not critical and can be selected as desired for the particular application contemplated. The important feature is the inner lubricious sheath formed of the fluoropolymer tube of the present invention, particularly where such fluoropolymer tube has an ultrathin-wall and/or tightly controlled inside diameter tolerance. Where the multilayered tube fabricated in accordance herewith is to be used as a medical catheter, it is advantageous to minimize its external diameter while maximizing its internal diameter. Accordingly, it is preferred that the external diameter of the outer sheath be less than about 0.0125 inch (3.18 mm) and that the inner sheath (i.e. fluoropolymer tube) have an internal diameter greater than about 0.010 inch (0.254 mm), preferably greater than about 0.050 inch (1.27 mm).

The invention may be further described with reference to the following example where all parts and percentages are by weight unless otherwise indicated.

EXAMPLE

In a Patterson-Kelley twin shell liquid-solids blender was blended a mixture of TEFLON 6C virgin polytetrafluoroethylene (PTFE) resin (Dupont) containing about 6% SPHERIGLASS borosilicate glass beads (Type 3000E, mean particle size about 25 microns, with coupling agent CP-26, Potters Industries Inc.), about 16% lubricant (Isopar H, Exxon Corp.) and about 0.3% pigment. This mixture was preformed into a cylindrical billet of slightly less than 1.75 inch diameter using a hydraulically actuated preformer at about 300 p.s.i.

The filled PTFE billet was then extruded onto a flexible stranded metal wire (19 strands of 30 AWG nickel-plated, annealed copper wire) of about 0.046 inch (1.07 mm) diameter at a reduction ratio of 700:1 using a Jennings extruder fitted with a 1.75 inch barrel and 0.625 inch center rod to give a filled PTFE coated wire of about 0.076 inch (1.93 mm) diameter. This coated wire was then passed through a series of ovens at about 400°–450° F. (204°–232° C.) to drive off the lubricant, followed by a series of sintering ovens at about 700° to 800° F. (371°–427° C.) to cure the extrudate, and collected on a take-up spool.

This PTFE core was then threaded through the center rod and guide tube tip of the jacketing extruder (Jennings extruder fitted with 1.25 inch barrel and 0.25 inch center rod) and an ultrathin coating of virgin PTFE (TEFLON 6C containing 18% Isopar H lubricant) was extruded onto the PTFE core (or mandrel) at a reduction ratio of about 1900:1. A 0.105 inch die and 0.102 inch guide tube tip were used for this procedure and both were polished to a mirror finish. The jacketing of the core was performed vertically at an extrusion speed of about 13 feet 4 inches per minute, while the core was being pulled through the extruder at about 13 feet 5 inches per minute. The puller for the core was speed adjustable in 1 inch increments. The jacketed core was then pulled through a series of ovens to volatilize the lubricant (400° to 500° F.) and sinter the PTFE (700° to 800° F.).

The PTFE tube thus prepared had a wall thickness of about 0.0020 inch (0.051 mm) ± 0.0005 inch (0.013 mm). The filled PTFE core was not bonded to the PTFE jacket and could be removed to provide a PTFE tube with a 0.081 inch O.D. (2.06 mm) and a 0.076 inch I.D. (1.93 mm).

The above process may be repeated as described with the exception that the jacketing extruder is fitted with a 0.75 inch barrel and 0.25 inch center rod, a 0.089 die and 0.084 guide tube are utilized, and the extrusion is conducted at a reduction ratio of 600:1 (with extrusion speed adjusted as appropriate) to provide a PTFE tube with an outside diameter of 0.078 inch (1.98 mm) and a wall thickness of about 0.001 inch (0.025 mm).

While the invention has been described in detail with respect to its preferred embodiments, this is for illustration purposes only and is not intended to limit the scope of the invention, which is limited only by the appended claims.

What is claimed is:

1. An article comprising an ultrathin-wall sintered fluoropolymer catheter tube having a wall thickness less than about 0.0020 inch (0.051 mm), said tube having a controlled relatively uniform inner diameter.

2. The tube of claim 1 having a wall thickness less than about 0.0015 inch (0.0038 mm).

3. The tube of claim 2 having a wall thickness of about 0.0010 inch (0.025 mm)±0.0005 inch (0.013 mm).

4. The tube of claims 1, 2 or 3 having an inner diameter which does not vary along its length by more than about ±0.0005 inch (0.013 mm).

5. The tube of claim 4 having an outer diameter less than about 0.100 inch (2.54 mm).

6. The tube of claim 5 having an inner diameter, greater than about 0.010 inch (0.254 mm).

7. The tube of claim 5 having an inner diameter greater than about 0.050 inch (1.27 mm).

8. The tube of claim 4 fabricated of polytetrafluoroethylene.

9. An article comprising a sintered ultrathin-wall fluoropolymer tube and inside said tube a cylindrical removable sintered fluoropolymer core wherein said core contains an inorganic filler comprising glass beads.

10. The tube of claim 9 wherein said inorganic filler is present in amount of about 3 to 10% by weight.

11. The tube of claim 10 wherein said glass beads have a mean particle size of about 5 to 50 microns.

12. The tube of claim 11 wherein said fluoropolymer tube and fluoropolymer core are fabricated of polytetrafluoroethylene.

13. The tube of claims 9, 11 or 12, wherein said fluoropolymer core comprises a fluoropolymer coated metal wire or stranded metal wire.

14. The tube of claims 9, 11 or 12, having a wall thickness less than about 0.0020 inch (0.05 mm).

15. The tube of claim 14 wherein said fluoropolymer core comprises a fluoropolymer coated metal wire or stranded metal wire.

16. An article comprising a multilayered tube comprising an outer sheath comprised of at least one material surrounding an inner lubricious sheath of a sintered fluoropolymer wherein said inner lubricious sheath has a wall thickness of less than about 0.002 inch (0.051 mm), said sheath having a controlled relatively uniform inner diameter.

17. The multilayered tube of claim 16 wherein said inner lubricious sheath has a wall thickness of less than about 0.0015 inch (0.038 mm).

18. The multilayered tube of claim 17 wherein said inner lubricious sheath has an inner diameter which does not vary along its length by more than about ±0.0005 inch (0.013 mm).

19. The multilayered tube of claim 18 wherein said outer sheath comprises a flexible polymeric material.

20. The multilayered tube of claim 19 wherein said flexible polymeric material is selected from polyurethanes, polyesters, polyolefins and polyamides.

21. The multilayered tube of claim 18 wherein said outer sheath comprises an outer layer of a flexible polymeric material surrounding an inner layer of a different material.

22. The multilayered tube of claim 21 wherein said flexible polymeric material is selected from polyurethanes, polyesters, polyolefins, and polyamides.

23. The multilayered tube of claim 22 wherein said inner layer of said outer sheath is braided metal.

24. The multilayered tube of claim 22 wherein said inner layer of said outer sheath is a rigid polymeric material.

25. The multilayered tube of claim 24 wherein said rigid polymeric material is selected from polycarbonates, polyethylene terephthalate, polyethylene terephthalate glycol, polyamides, polyacetals, polyimides, polyamide-imides, and copolymers thereof.

26. The multilayered tube of claims 23 or 25 wherein the outer sheath has an external diameter less than about 0.125 inch (3.18 mm).

27. The multilayered tube of claim 26 wherein the inner sheath has an internal diameter greater than about 0.050 inch (1.27 mm).

28. An article comprising a multilayered tube comprising an outer sheath comprised of at least one material surrounding an inner lubricious sheath of a sintered fluoropolymer wherein said inner lubricious sheath has a wall thickness of less that about 0.0020 inch (0.051 mm), said sheath having a controlled relatively uniform inner diameter, wherein said inner lubricious sheath surrounds a cylindrical removable sintered fluoropolymer core.

29. The multilayered tube of claim 28 wherein said fluoropolymer core contains an inorganic filler.

30. The multilayered tube of claim 29 wherein said inorganic filler comprises glass beads.

31. The multilayered tube of claim 30 wherein said inorganic filler is present in an amount of about 3 to 10% by weight.

32. The multilayered tube of claim 31 wherein said glass beads have a mean particle size of about 50 to 100 micron.

33. The multilayered tube of claim 32 wherein said inner lubricious sheath and said fluoropolymer core are fabricated of polytetrafluoroethylene.

34. The multilayered tube of claims 28, 29, 30, 31, 32 or 33 wherein said fluoropolymer core comprises a fluoropolymer coated metal wire or stranded metal wire.

35. The multilayered tube of claim 28 wherein said outer sheath comprises a flexible polymeric material.

36. The multilayered tube of claim 35 wherein said flexible polymeric material is selected from polyurethanes, polyesters, polyolefins and polyamides.

37. The multilayered tube of claim 28 wherein said outer sheath comprises an outer layer of a flexible polymeric material surrounding an inner layer of a different material.

38. The multilayered tube of claim 37 wherein said flexible polymeric material is selected from polyurethanes, polyesters, polyolefins and polyamides.

39. The multilayered tube of claim 38 wherein said inner layer of said outer sheath is braided metal.

40. The multilayered tube of claim 38 wherein said inner layer of said outer sheath is a rigid polymeric material.

41. The multilayered tube of claim 40 wherein said rigid polymeric material is selected from polycarbonates, polyethylene terephthalate, polyethylene terephthalate glycol, polyamides, polyacetals, polyimides, polyamide-imides and copolymers thereof.

42. The multilayered tube of claims 35, 36, 37, 38, 39, 40 or 41 wherein said fluoropolymer core contains about 3 to 10% by weight of an inorganic filler comprising glass beads.

43. The multilayered tube of claim 42 wherein said inner lubricious sheath and said fluoropolymer core are fabricated of polytetrafluoroethylene.

44. The multilayered tube of claim 43 wherein said fluoropolymer core comprises a fluoropolymer coated metal wire or stranded metal wire.

45. The multilayered tube of claim 44 wherein the outer sheath has an external diameter less than about 0.125 inch (3.18 mm) and the inner sheath has an internal diameter greater than about 0.050 inch (1.27 mm).

46. An article comprising an essentially void free ultrathin-wall fluoropolymer tube having a wall thickness less than about 0.002 inch (0.051 mm), said tube having a controlled relatively uniform inner diameter.

47. The tube of claim 46 having a wall thickness of less than about 0.0015 inch (0.0038 mm).

48. The tube of claim 47 having a wall thickness of about 0.0010 inch (0.025 mm)+/−0.0005 inch (0.013 mm).

49. The tube of claims 46, 47, or 48 having an inner diameter which does not vary along its length by more than about+/−0.005 inch (0.013 mm).

50. The tube of claim 49 having an outer diameter less than about 0.100 inch (2.54 mm).

51. The tube of claim 50 having an inner diameter greater than about 0.010 inch (0.254 mm).

52. The tube of claim 50 having an inner diameter greater than about 0.050 inch (1.27 mm).

53. The tube of claim 49 fabricated of polytetrafluoroethylene.

* * * * *